Figure 1:
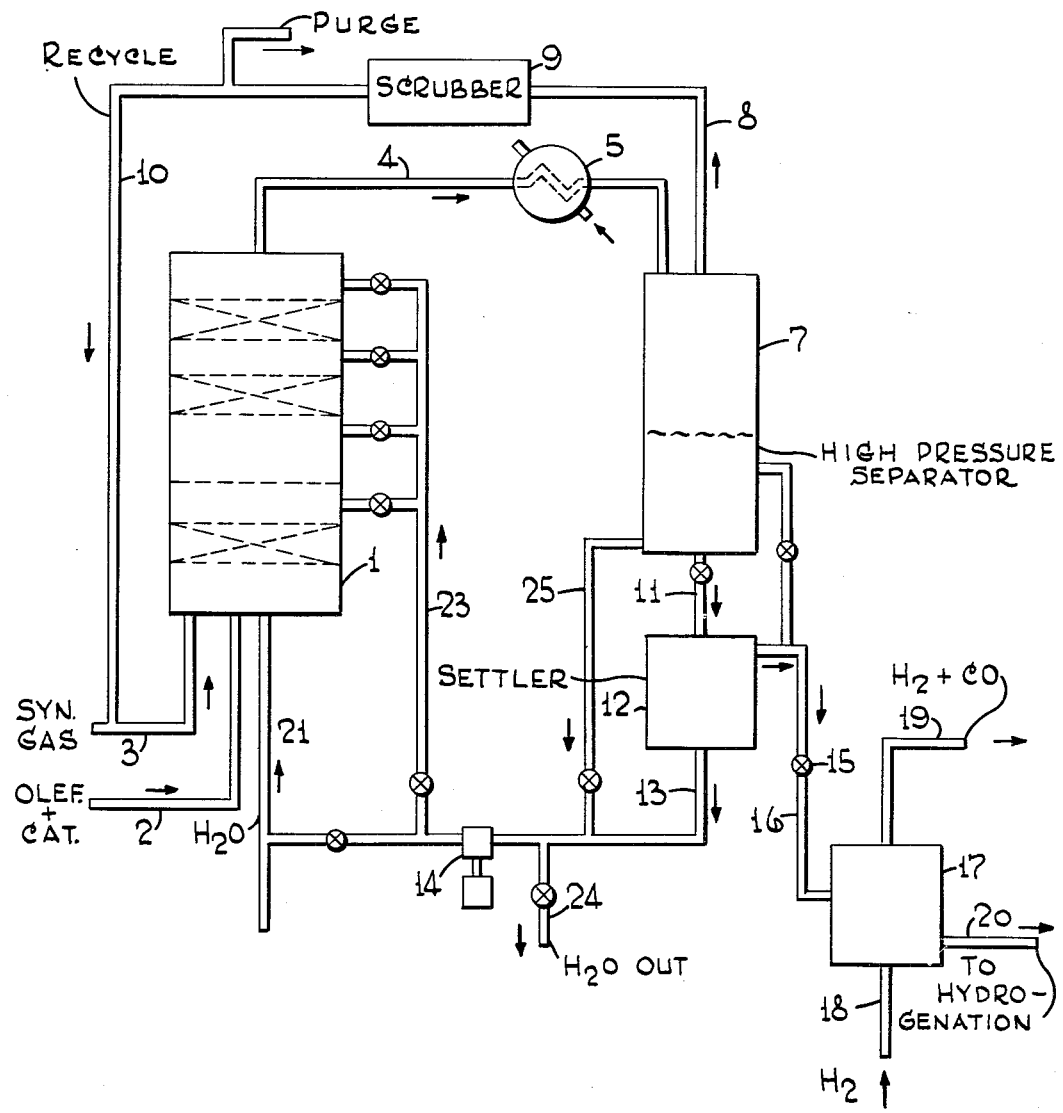

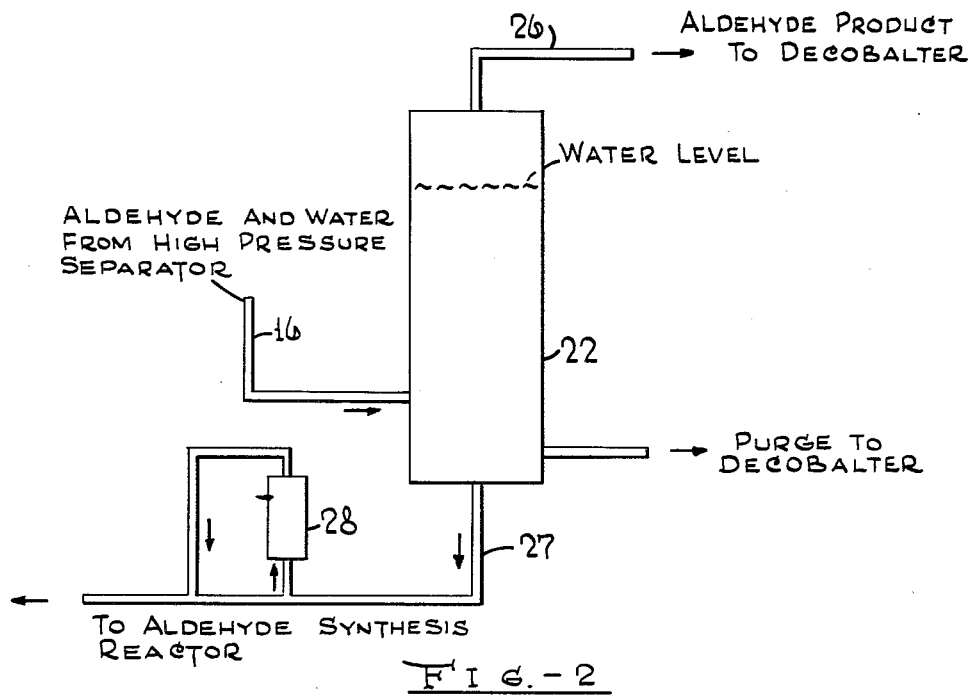
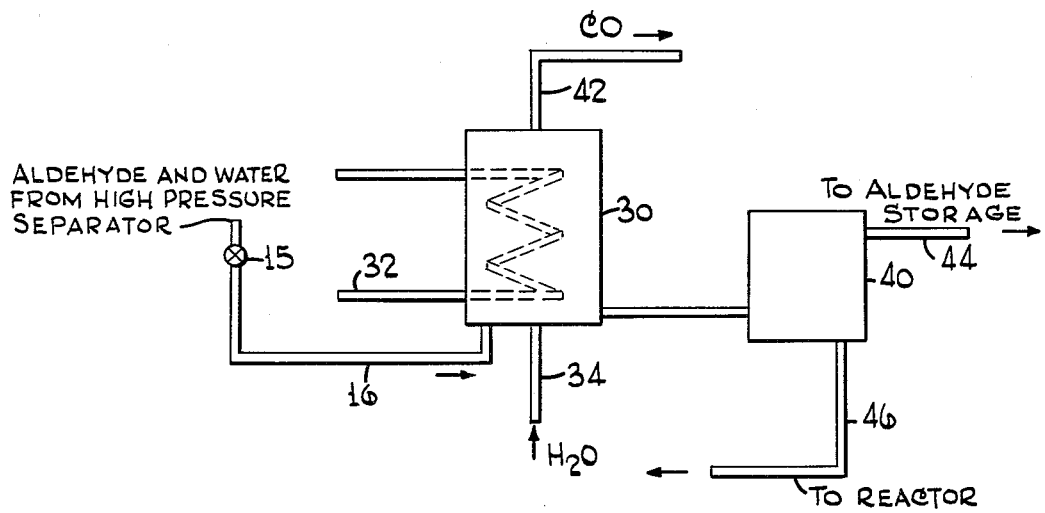

United States Patent Office 2,754,331
Patented July 10, 1956

2,754,331

COOLING AND CATALYST RECYCLE IN OXO SYNTHESIS

Warren M. Smith, Baton Rouge, La., assignor to Esso Research and Engineering Company, a corporation of Delaware Application November 17, 1950, Serial No. 196,107

9 Claims. (Cl. 260—604)

The present invention relates to the preparation of oxygenated organic compounds by the reaction of carbon compounds containing olefinic linkages with hydrogen and carbon monoxide in the presence of a carbonylation catalyst. More specifically this invention relates to an improved process for controlling the heat of reaction in the carbonylation reaction zone and of maintaining high concentrations of active catalyst species in said zone.

It is well known in the art that oxygenated organic compounds may be synthesized from organic compounds containing olefinic linkages by a reaction with carbon monoxide and hydrogen in the presence of catalyst containing metals of the iron group in a two stage process in which predominantly aldehydes and minor proportions of ketones and alcohols are formed in a first step in the presence of a carbonylation catalyst comprising metals of the iron group, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as metallic supported or unsupported nickel, copper chromite, sulfactive catalysts such as oxides and sulfides of tungsten, nickel and molybdenum and the like.

This carbonylation or Oxo reaction by which name this process is generally known, provides a particularly attractive method of preparing primary alcohols to supply the large market for plasticizers, detergents, solvents and the like. Amenable to the reaction are long and short chained olefinic compounds, not only hydrocarbons but most other organic compounds having a carbon-to-carbon olefinic linkage such as unsaturated alcohols, acids, esters and the like. Straight and branch chained olefins and di-olefins such as propylene, butene, butadiene, pentene, pentadiene, hexene, heptene, styrene, olefin polymers such as di and tri-isobutylene hexene and heptene dimers, polypropylenes, olefinic fractions from the hydrocarbon synthesis process, thermal or catalytic cracking operations and other sources of hydrocarbon fractions containing such olefins may be used as starting materials depending on the nature of the final product desired. The synthesis gas mixture fed to the first stage may be any desired ratio of $H_2$ to CO, preferably within the limits of 0.5 to 2 volumes hydrogen per volume of carbon monoxide. The conditions for reacting olefins with the synthesis gases vary somewhat in accordance with the nature of the olefin feed, the reaction being generally conducted at pressures in the range of from about 1500 to 4500 p. s. i. g. and the ratio of synthesis gas to olefin may vary widely; in general, about 2500 to 25,000 cubic feet of $H_2+CO$ per barrel of olefin feed are employed.

The catalyst for the first stage of the process is usually employed in the form of an oil soluble compound of the catalytically active carbonylation metal. Thus there have been employed the salts of the metals such as iron or cobalt, and high molecular weight fatty acids such as stearic, oleic, naphthenic, linoleic and the like. Catalyst concentrations may vary from about 0.5 to 5.0% by weight of the catalyst salt based on the olefinic feed. The first stage or carbonylation reaction is generally carried out at temperatures in the range of from about 250° to 450° F. depending upon the nature of the olefin and other reaction conditions. In general, the lower olefins will react at lower temperatures than the high molecular weight olefins. The carbonylation reaction is an exothermic one, with a heat release of the same high order of magnitude as in the hydrocarbon synthesis process, about 35 to 50 kcal./gram-mol olefinic double bond reacted and, therefore, careful temperature control is required in the reaction zone to prevent decomposition of cobalt carbonyl to metallic cobalt and also to prevent formation of secondary reaction products and undesired reactions such as hydrogenation of the olefin, formation of hydrocarbon synthesis products, polymerization of Oxo products and the like. At 3000 p. s. i. g. (1500 p. s. i. g. CO partial pressure) cobalt carbonyl starts to decompose at an appreciable rate above 350° F., thus decreasing the concentration of active catalyst. On the other hand, temperatures are preferably kept above 300° F. so as to keep the reaction rate up to a reasonable figure to insure high olefin conversions at reasonable feed rates.

Heretofore, this cooling has been accomplished by injection of cooled recycle synthesis gas into the Oxo reactor. This process is unsatisfactory because at the relatively low temperature levels of the carbonylation reaction and the low temperature gradient within the reactor, about 30°–100° F., there are required excessively large amounts of cooling gas, on the order of about 25,000–100,000 cubic feet per barrel of olefin treated. This cooling gas must also first be scrubbed with suitable liquid to remove cobalt carbonyl to prevent line plugging and thus high gas rates would mean large quantities of scrubbing liquid which must subsequently be run through a catalyst removal zone.

Another problem inherent in a liquid phase Oxo process in which the catalyst is supplied as an oil-soluble soap of the carbonylation metal is the conversion of such catalytically inactive oil soluble compound into the active species of the catalyst. There is good ground for believing that the active form of the carbonylation catalyst may be the carbonyl of the metal, such as cobalt carbonyl and iron carbonyl, or some other molecule arising from the interaction of cobalt or iron and their compounds with CO.

It is known that there is a definite time lag within the reactor which is required to convert the catalyst salt of the fatty acid to the carbonyl and in a continuous process in which olefin, containing in solution the catalyst salt, and also the synthesis gases are fed concurrently into the bottom of the Oxo reactor, the actual interaction of the cobalt carbonyl and the olefin feed does not occur in the lower portion of the reactor because in that portion the cobalt carbonyl has first to be synthesized by interaction of carbon monoxide in the feed gas with the catalyst salt dissolved in the olefin feed; thus, a substantial portion of the reactor plays no part in the catalytic conversion of the olefins to oxygenated products.

One good method for controlling the heat of reaction and for providing active catalyst in the lower portion of the reactor is to recycle a portion of the first stage Oxo product (i. e., aldehyde containing cobalt carbonyl in solution), after cooling and separation of gases in a high pressure separator. This aldehyde product has a much higher heat capacity than an equivalent volume of gas and, hence, a substantially smaller amount is required for recycling. Also, since the aldehyde recycled contains dissolved catalyst, recycle of this material to the lower portion of the first stage reaction zone provides a high concentration of the catalytic material near the reactor inlet where it is capable of accomplishing a large degree of reaction before cobalt salts introduced to the reactor dissolved in the fresh feed are converted to cobalt carbonyl and are able to function as catalysts.

This process, though a considerable step forward, has the disadvantage that the recycled aldehyde product is maintained for a substantial length of time at the elevated pressures and temperatures existing in the primary carbonylation zone. Thus, under the influence of heat, secondary reactions of the aldehyde product, such as aldolization, polymerization, Cannizzaro type of reactions, etc., are favored.

It is one of the objects of the present invention to disclose an improved process whereby the heat of the reaction in the aldehyde synthesis process may be advantageously controlled without recirculating large volumes of cooling gases, or recycling heat sensitive aldehyde reaction products.

It is another object of the present invention to suppress the formation of secondary reaction products, such as acetals resulting from the interaction of aldehydes and alcohols, within the primary reaction zone.

A further purpose of the present invention is to disclose a means whereby high catalyst concentrations may be maintained throughout the entire reactor.

A further purpose of the present invention is to disclose a process for utilizing to maximum efficiency the catalyst employed in the process.

Other and further objects and advantages of the invention will be in part obvious and will in part appear hereinafter.

These objects and advantages may, in brief compass, be achieved by injecting into the primary reaction zone along with the olefin feed and synthesis gas a given quantity of water, passing the aldehyde product and water to a cooler, then to a high pressure gas-liquid separation zone, thereafter separating water from the liquid product, and recycling the water only to the primary reaction zone to provide the cooling required therein.

It has, in the past, been recognized that injection of water into the carbonylation or aldehyde synthesis zone is accompanied by desirable results. Thus in the course of the aldehyde synthesis reaction, some of the aldehydes formed are further reduced to alcohols in the presence of the $H_2/CO$ gas mixture, and these alcohols react with additional aldehydes to produce undesirable acetals. Addition of water to the primary stage has the effect of at least partially suppressing this acetal reaction. In accordance with the present invention, advantage is taken of the fact that the water in the high pressure separator is substantially at the same pressure as the products in the aldehyde synthesis reactor, and thus requires no expensive steam or compressing equipment to bring the water to the necessary high pressures, and the water added initially may be cut back as the reaction progresses. Furthermore, it has been determined that the active cobalt carbonylation catalyst is cobalt carbonyl, specifically cobalt hydrocarbonyl, which is appreciably water soluble as $HCo(CO)_4$, at high pressures. By recycling water from the high pressure separator to the lower portion of the reactor, there is thus realized not only the cooling and control of the reaction temperature, but also, recycle of this material to the lower portion of the reactor provides a high concentration of the catalytic material at that region of the reactor where it is normally deficient, as pointed out above, and where it is thus capable of accomplishing a considerable degree of reaction before the cobalt salts or soaps introduced extraneously into the reactor are converted to cobalt carbonyl and thus able to function as catalysts.

The present invention will best be understood from the more detailed description presented hereinafter, wherein reference will be made to the accompanying drawings which are schematic illustrations of systems suitable for carrying out preferred embodiments of the invention.

In Figure I there is shown an embodiment wherein water is initially added to the reactor along with synthesis gas, olefin and catalysts, and wherein the product from the reaction is cooled, separated at high pressures and the water only is recycled to the reactor to maintain temperature control.

In Figure II there is shown an alternative method of removing water from the aldehyde product and recycling the former with dissolved cobalt, back to the Oxo synthesis reactor.

In Figure III there is shown an embodiment of the present invention wherein the cooling water is recycled from the decobalter, which water may contain in solution dissolved cobalt salts and compounds, as will be made clear hereinafter.

Referring first to Figure I, an olefinic hydrocarbon having one carbon atom less than the number of carbon atoms in the desired resulting oxygenated compound and preferably alkali washed prior to reaction is fed through feed line 2 to the bottom portion of primary reactor 1. Reactor 1 comprises a reaction vessel which may, if desired, be packed with non-catalytic material such as Raschig rings, porcelain chips, ceramic material, pumice and the like. Reactor 1 may be divided into discrete packed zones separated by any suitable means such as support grids, etc. or it may comprise but a single packed zone, or it may contain no packing.

The olefinic feed may contain dissolved therein 1–3% by weight of cobalt oleate based on the olefin. It is understood that other compounds of cobalt or compounds of iron or mixtures of compounds of cobalt and iron soluble in the olefins may also be used equally effectively. Also, it may be desirable to employ, instead of an oil soluble cobalt compound, a compound of cobalt that is water soluble, such as the acetate, chloride, etc. In such case, cobalt may be added in aqueous solution along with the water injected as below. Simultaneously, a gas mixture containing hydrogen and carbon monoxide in the approximate ratio of 0.5 to 2 volumes of hydrogen per volume of carbon monoxide is supplied through line 3 to primary reactor 1 and flows concurrently through reactor 1 with said olefin feed. Reactor 1 is preferably operated at a pressure of about 2500–3500 p. s. g. and at a temperature of from 250° to 450° F. depending upon the olefin feed and other reaction conditions. The rate of flow of synthesis gases and olefins through reactor 1 is so regulated that the desired conversion level of the olefin is obtained. To provide the water required initially for cooling and subsequent recycle, water or steam is injected into reactor 1 through line 21. The amount of water added may be up to 100 to 200% by weight of the olefin in the feed, depending upon the nature of the olefin. The water may, if desired, have in solution water soluble cobalt compounds, as acetate, propionate, chloride, etc.

As indicated above, extraneous water addition is preferably cut back as the reaction progresses, and water is recycled from the system.

The carbonylation reaction in reactor 1 is carried out substantially adiabatically, that is, no external cooling means such as by tubes or coils is provided but the cooling and temperature control is carried out in the process of the present invention as disclosed below. Liquid oxygenated reaction products containing catalyst in solution and unreacted synthesis gases are withdrawn from an upper portion of high pressure reactor 1 and are transferred through line 4 to cooler 5 in which are employed any conventional means of cooling, and from thence via line 6 to high pressure separator 7 where unreacted gases are withdrawn overhead through line 8 scrubbed in scrubber 9 of entrained liquid and used in any way desired; they may be recycled through line 10 to synthesis gas feed line 3 or purged.

In accordance with the present invention, liquid Oxo products are withdrawn from high pressure separator 7 and passed through line 11 without significant pressure release to high pressure settling zone 12. In zone 12 separation into a lower aqueous and an upper organic layer occurs. A stream of water containing dissolved therein appreciable quantities of cobalt as hydrocarbonyl is withdrawn from settler 12 through line 13 and passed through pump 14 to the lower portion of reactor 1, via line 21. The amount of water recycled is a function of the amount of cooling required in reactor 1, the temperature gradient throughout the reactor being in the range of from about 30°–100° F. The cooled water from settler 12 is at a temperature level 200–250° F. lower than that maintained in Oxo reactor 1. The cobalt hydrocarbonyl thus added along with the extraneously added cobalt thus enables the reaction to proceed throughout the full length of the reactor rather than only in the upper portion.

Recycle water may be injected into the first cooling section of the Oxo reactor, and also into other sections in addition, to obtain closer temperature control throughout the reactor, through manifold 23. Approximately a total of 100 to 200 volume percent of recycle water in the fresh olefin feed many be used for temperature control purposes.

It may be noted that among the advantages obtained by recycling water instead of cooling aldehyde product is the fact that water has a considerably higher heat capacity than the aldehyde, and hence substantially less water need be recycled than would aldehyde to achieve the same extent of cooling.

It is understood that separation of layers may be obtained, if desired, in separator 7 and the water recycled from there directly via line 25 rather than from settler 12.

Aldehyde products are withdrawn as an upper layer from settler 12 (or separator 7), and passed through pressure release valve 15 and line 16. Such aldehyde products comprise any unreacted olefin as well as aldehydes, other Oxo products and dissolved catalyst compounds. This liquid is passed through line 16 to catalyst removal zone 17 wherein by suitable heat treatment at about 300°–400° F. the dissolved catalyst is decomposed to the metal or other insoluble forms of cobalt.

A stream of hydrogen comprising gas may be admitted to catalyst removal zone 17 through line 18 the purpose of such hydrogen being to aid in stripping and removing the evolved carbon monoxide from catalyst removal zone 17. The said catalyst removal zone 17 may if desired be a packed vessel and the decomposed catalyst depositing as metal cobalt on the packing, the packing may consist of any desired non-catalytic refractory metal such as Raschig rings, pumice and the like. However, if desired, the catalyst removal zone 17 may not contain packing. The catalyst removal zone may be operated at pressures from about 50 to 3000 p. s. i. g. The gas stream comprising hydrogen and carbon monoxide produced by decomposition of the cobalt carbonyl may be removed from catalyst removal zone 17 through line 19 and transferred to another portion of the system as to a hydrogenation zone or to a methanization zone (not shown) in which the carbon monoxide is catalytically reduced by processes known per se to form a gas mixture consisting of hydrogen and methane which may be used for subsequent hydrogenation or as purge gas in catalyst removal zone 17.

The liquid Oxo reaction product now substantially free of carbonylation catalyst is withdrawn from the catalyst removal zone 17 through line 20 and may be treated in any desired manner, such as subsequent hydrogenation to alcohols.

A particularly effective method for separating and removing water from the aldehyde product and recycling the former to the reactor is shown in Figure II. Aldehyde and water are passed to the high pressure separator as shown in Figure I. Thereupon the total liquid product is withdrawn through line 16 to a tower 22, the stream entering tower 22 in its lower section. Within 22, separation of the phases occurs, and the water level is maintained at about ⅔ the distance up the tower, the tower thus functioning both as a scrubber and phase separator. The aqueous layer in the tower, as a result of the scrubbing action, is enriched in cobalt content such that it contains relatively high concentrations of cobalt, both as cobaltous ion and as cobalt hydrocarbonyl, which is appreciably water soluble.

Water is withdrawn from the bottom of tower 22 and is recycled to reactor 1 in amounts and in a manner described in connection with Figure I. If desired, a portion of the recycled water may be passed through vessel 28 packed with water soluble make-up catalyst for enrichment. Overhead from tower 22, aldehyde product is withdrawn through line 26 for further treatment to reduce cobalt content, as described previously.

Thus, in a continuous semi-commercial plant for the preparation of isooctyl alcohol from a heptene fraction boiling in the range of about 175–210° F., and with water injection into the Oxo reactor, wherein the water contained in solution 7.5 wt. per cent cobalt in the form of cobaltous acetate (3 vol. per cent solution added on olefin feed), the water withdrawn from the Oxo stage had the following composition:

| | Weight per cent |
|---|---|
| Acidity as formic acid | 1.35 |
| Iron as $Fe^{+++}$ | 0.06 |
| Cobalt as $Co^{++}$ | 0.9 |
| Cobalt as $HCo(CO)_4$ | 0.6 |

On the basis of the total amount of solution of the above composition withdrawn, this represents about 30% of the cobalt injected.

By employing the scrubbing effect of tower 22, the cobalt concentrations in the recycle water should account for 50% or more of the cobalt entering the Oxo stage.

Instead of the thermal decobalting described above, wherein the cobalt carbonyl is converted into insoluble material, decobalting may also be carried out in the presence of water under conditions where a large part of the cobalt is converted into water soluble material. In another embodiment of the present invention, this latter is the preferred method of decobalting, as described below, when read in connection with Figure III.

It has been found, as indicated above, that decobalting may be accomplished by adding water or steam to the aldehyde product in the decobalter and maintaining steam pressures therein up to about 250 p. s. i. g. and temperatures up to 400° F. It has now been found that the reaction conditions within the decobalter play an important part in determining the physical state in which the cobalt appears after decobalting. As a result of the Oxo reaction, there is formed within the primary carbonylation zone substantial amounts of formic acid and formic acid esters resulting from secondary reactions involving carbon monoxide and possibly resulting in part from the acid radical of the cobalt soaps added as catalyst. It has been found that when the aldehyde product is treated with water or steam at the conditions indicated, the cobalt carbonyl is decomposed and is converted into cobalt metal, cobalt basic formate, and cobalt formate, the latter being water soluble. The formation of these materials appears to be a function of the decobalting conditions, large volumes (5–10%) of water and relatively long (2 hours) residence time favoring formation of the cobalt formate, i. e., by reaction of other forms of cobalt with formic acid produced by hydrolysis during decobalting, whereas shorter residence time and less water favors formation of the insoluble cobalt metal and basic cobalt formate.

In accordance with one embodiment of the present invention, therefore, the total water and aldehyde product is passed from the high pressure separator to the decobalter and decobalting carried out under conditions wherein appreciable amounts of the cobalt are converted into the soluble cobalt formate which, after cooling, is recycled to the Oxo reactor to provide not only cooling but also an economic cobalt utilization process.

Such a process is shown in Figure III. The total liquid stream from the high pressure separator 7, including both water and aldehyde product, is withdrawn through pressure release valve 15, whereby the pressure is lowered from about 2500–3000 p. s. i. g. to 100 to 500 p. s. i. g. and passed to decobalter 30 through line 16. Within the latter vessel, heat is supplied by closed steam coil 32. Within decobalter 30 there is maintained a temperature in the range of about 300 to 400° F. and a pressure of 100 to 300 p. s. i. g. The throughput rate of the liquid material is controlled so that a residence time of about ½ to 2 hours is maintained, which is conducive to removing and recovering cobalt to a large extent in a water soluble form. If desired, a small amount of additional steam or water may be supplied through line 34.

Within decobalter 30, cobalt carbonyl is substantially completely decomposed to cobalt metal and other forms of cobalt and carbon monoxide, and the total product may, if desired, be passed to a settler 40. Gasiform material, such as CO, is withdrawn overhead through line 42 and removed from the system. The liquid mixture is allowed to separate into an upper layer comprising mainly aldehydes free of cobalt, and a lower aqueous layer containing substantial amounts of cobalt in solution, for instance, in the form of cobalt formate. Some precipitated metal and insoluble basic cobalt formate also are formed.

The upper layer is withdrawn through line 44 and is passed to storage for subsequent hydrogenation. The lower aqueous layer, in accordance with the present invention, is recycled via line 46 to the aldehyde synthesis reactor to supply the cooling control and also a part of the catalyst requirements, substantially as described in accordance with Figure I.

While the foregoing and exemplary operations have served to illustrate specific applications of the invention, other modifications obvious to those skilled in the art are encompassed within the scope of the invention.

What is claimed is:

1. In an exothermic carbonylation process wherein olefinic compounds, carbon monoxide and hydrogen are continuously contacted in an initial reaction zone with a cobalt carbonylation catalyst under elevated temperatures and pressure to produce reaction products comprising aldehydes and wherein reaction products, cobalt compounds including cobalt hydrocarbonyls, and water, are withdrawn from said initial zone and passed via a cooling zone to a gas-liquid high pressure separation zone wherein liquid products containing aldehyde, water and cobalt compounds are separated from uncondensed gases, the improvement which comprises initially adding extraneous water to said first-named zone separating water and water-soluble cobalt hydrocarbonyl from said liquid product, cooling said water to a temperature substantially lower than that in said initial reaction zone, and passing at least a portion of said water and dissolved cobalt hydrocarbonyl to said initial zone whereby a high concentration of active catalyst is maintained in said zone and whereby cooling for said exothermic process is provided.

2. The process of claim 1 wherein the flow of said extraneous water is reduced as said reaction continues.

3. The process of claim 1 wherein said water is separated from said aldehyde in a separation zone under substantially the same pressures as those prevailing in said initial reaction zone.

4. The process of claim 1 wherein said recycled water and dissolved active cobalt hydrocarbonyl catalyst is injected into the first cooling zone of said initial reaction zone, said first cooling zone being in the vicinity of the olefinic compound injection point, said reaction zone being normally deficient in active cobalt catalyst in said vicinity.

5. The process of claim 1 wherein said recycled hydrocarbonyl containing water is injected into said initial reaction zone at a plurality of points spaced in the direction of flow of said reaction products through said reaction zone.

6. The process of maintaining high concentrations of active cobalt carbonyl catalyst throughout a carbonylation reaction zone and whereby cooling is provided for said zone, which comprises continuously feeding to said zone, hydrogen, carbon monoxide, olefinic hydrocarbons, water and a catalytically inactive cobalt comprising material, converting said last-named material to the catalytically active cobalt carbonyl, reacting said olefinic compounds, hydrogen and carbon monoxide in the presence of said catalytically active cobalt carbonyl to form an aldehyde product, withdrawing a liquid stream comprising said aldehyde product water and cobalt hydrocarbonyl from said zone, cooling said stream, separating under pressure a water layer containing cobalt compounds from said aldehyde product, and passing at least a portion of said active cobalt catalyst containing water layer to said initial reaction zone.

7. The process of claim 6 wherein said recycled water and cobalt is injected into said zone at a point in the vicinity of the olefin injection point.

8. The process of claim 6 wherein said recycled water-containing dissolved cobalt is injected into said initial zone at a plurality of points spaced in the direction of flow of said reaction products to said reaction zone.

9. An improved process for providing cooling and uniform catalyst concentration throughout an exothermic carbonylation reaction zone which comprises continuously feeding to said zone $H_2$, CO, olefinic hydrocarbons, water and a catalytically inactive cobalt comprising material, converting said last named material to cobalt carbonyl within said carbonylation zone, reacting said olefinic compounds $H_2$ and CO in the presence of said catalytically active cobalt carbonyl to form aldehyde, withdrawing a liquid stream comprising said aldehyde product, water and cobalt carbonyl from said zone, cooling said stream, passing said cooled stream to a gas-liquid separation zone, separating gases from said liquids, passing said liquids comprising aldehydes, water and dissolved cobalt to a liquid-liquid separation zone, injecting said liquids into a lower portion of said zone, maintaining a water level in the upper portion of said zone, scrubbing out cobalt hydrocarbonyl from said aldehyde product by said water, withdrawing said cobalt hydrocarbonyl-containing water from said zone and passing at least a portion thereof to said carbonylation zone.

References Cited in the file of this patent

UNITED STATES PATENTS

| | | |
|---|---|---|
| 2,437,600 | Gresham et al. | Mar. 9, 1948 |
| 2,448,368 | Gresham et al. | Aug. 31, 1948 |
| 2,517,383 | Brooks | Aug. 1, 1950 |
| 2,557,701 | Smith | June 19, 1951 |
| 2,564,104 | Gresham et al. | Aug. 14, 1951 |
| 2,564,130 | Schreyer | Aug. 14, 1951 |
| 2,636,903 | Mertzweiller | Apr. 28, 1953 |
| 2,647,149 | Condit et al. | July 28, 1953 |
| 2,679,534 | Koontz | May 25, 1954 |

FOREIGN PATENTS

| | | |
|---|---|---|
| 657,526 | Great Britain | Sept. 19, 1951 |

OTHER REFERENCES

I. G. Farbenindustrie Aktiengesellschaft Pat. Application Nos. I 71,966 IVd/120 dated Apr' 2, 1942, and Number I 72,948 IVd/120 dated Aug. 10, 1942. TOM Reel 36, Fiat 167.

The Oxo Process, Fiat #1000, PB 81,383, Dec. 26, 1947, page 34.